United States Patent
Avedisov et al.

(10) Patent No.: US 11,113,969 B2
(45) Date of Patent: Sep. 7, 2021

(54) DATA-TO-CAMERA (D2C) BASED FILTERS FOR IMPROVED OBJECT DETECTION IN IMAGES BASED ON VEHICLE-TO-EVERYTHING COMMUNICATION

(71) Applicant: TOYOTA JIDOSHA KABUSHIKI KAISHA, Toyota (JP)

(72) Inventors: Sergei Avedisov, Mountain View, CA (US); Gaurav Bansal, Mountain View, CA (US); Hongsheng Lu, Mountain View, CA (US); Rui Guo, Mountain View, CA (US)

(*) Notice: Subject to any disclaimer, the term of this patent is extended or adjusted under 35 U.S.C. 154(b) by 82 days.

(21) Appl. No.: 16/295,583

(22) Filed: Mar. 7, 2019

(65) Prior Publication Data
US 2020/0286382 A1 Sep. 10, 2020

(51) Int. Cl.
| | |
|---|---|
| G08G 1/16 | (2006.01) |
| G06K 9/62 | (2006.01) |
| H04W 4/40 | (2018.01) |
| G06K 9/00 | (2006.01) |
| B60R 1/00 | (2006.01) |

(52) U.S. Cl.
CPC ........... *G08G 1/16* (2013.01); *G06K 9/00805* (2013.01); *G06K 9/623* (2013.01); *H04W 4/40* (2018.02); *B60R 1/00* (2013.01); *B60R 2300/30* (2013.01)

(58) Field of Classification Search
CPC combination set(s) only.
See application file for complete search history.

(56) References Cited

U.S. PATENT DOCUMENTS

| | | | |
|---|---|---|---|
| 2015/0344028 A1* | 12/2015 | Gieseke | B62D 15/028 701/1 |
| 2016/0162747 A1* | 6/2016 | Singh | G06K 9/00362 348/148 |
| 2017/0154241 A1* | 6/2017 | Shambik | B60R 11/04 |
| 2017/0169301 A1* | 6/2017 | Kunze | G06K 7/10722 |
| 2017/0317748 A1* | 11/2017 | Krapf | H04B 10/116 |
| 2018/0075309 A1* | 3/2018 | Sathyanarayana | G05D 1/0055 |
| 2019/0088125 A1* | 3/2019 | Park | G08G 1/166 |
| 2020/0074735 A1* | 3/2020 | Nowakowski | B60R 1/00 |

* cited by examiner

*Primary Examiner* — Omar S Ismail
(74) *Attorney, Agent, or Firm* — Burbage Law, P.C.; Jon-Michael Burbage; Elizabeth Ruzich (57) ABSTRACT

The disclosure describes a method for an ego vehicle. The method includes receiving a vehicle-to-everything (V2X) message that describes an object that is within proximity of an ego vehicle. The method further includes generating a set of data-to-camera (D2C) filters that are specific to the object described by the V2X message. The method further includes applying the set of D2C filters to image data that describes an initial image of the object. The method further includes generating a modified image, based on applying the set of D2C filters to the image data, wherein the modified image includes an indication of (1) a location and a size of the object in the initial image and (2) a type of object in the initial image.

20 Claims, 8 Drawing Sheets

BSM DATA

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle path history
Path prediction
Hard active braking
Traction control system active over 100 milliseconds
Antilock brake system active over 100 milliseconds
Light change and exterior lights (status)
Wipers changed and wiper status
Vehicle type (BSM currently only includes this for fleet vehicles)

DATA-TO-CAMERA (D2C) BASED FILTERS FOR IMPROVED OBJECT DETECTION IN IMAGES BASED ON VEHICLE-TO-EVERYTHING COMMUNICATION

BACKGROUND

The specification relates to object detection for vehicles.

Real-time object detection from image frames is a challenging problem that is prone to error. In general, there is a tradeoff between speed and accuracy that makes application of this technology too problematic to use in vehicles. Specifically, object detection for vehicles must be performed quickly and accurately in order to aid the vehicle is making real-time decisions. When this technology is performed too slowly or it includes too many errors, it results in safety hazards including the potential for causing or failing to avoid accidents while driving.

SUMMARY

Described are embodiments of a method for identifying an object in real time. The method includes receiving a vehicle-to-everything (V2X) message that describes an object that is within proximity of an ego vehicle. The method further includes generating a set of data-to-camera (D2C) filters that are specific to the object described by the V2X message. The method further includes applying the set of D2C filters to image data that describes an initial image of the object. The method further includes generating a modified image, based on applying the set of D2C filters to the image data, wherein the modified image includes an indication of (1) a location and a size of the object in the initial image and (2) a type of object in the initial image.

Implementations may include one or more of the following features. The method further includes providing the modified image to an Advanced Driver Assistance System of the ego vehicle to reduce or eliminate a driving hazard caused by the object. In some embodiments, the V2X message includes a Basic Safety Message (BSM) that describe the location of the object, the size of the object, an identity of the object, and a heading of the object. In some embodiments, the image data is generated by one or more cameras that are part of the ego vehicle and the initial image is a raw image. The method further includes receiving range data describing a range between the object and the ego vehicle, wherein the range is measured by a range finding sensor of the ego vehicle. In some embodiments, the object is a remote vehicle and the V2X message is a BSM received from the remote vehicle. In some embodiments, the set of D2C filters are generated in real time and the set of D2C filters describe digital data that is operable to modify the initial image.

One general aspect includes a system for an ego vehicle, comprising: a processor; and a non-transitory memory storing computer code which, when executed by the processor, causes the processor to: receive a V2X message that describes an object that is within proximity of an ego vehicle, generate a set of D2C filters that are specific to the object described by the V2X message, apply the set of D2C filters to image data that describes an initial image of the object, and generate a modified image, based on applying the set of D2C filters to the image data, wherein the modified image includes an indication of (1) a location and a size of the object in the initial image and (2) a type of object in the initial image.

Implementations may include one or more of the following features. The system where the computer code, when executed by the processor, further causes the processor to provide the modified image to an Advanced Driver Assistance System of the ego vehicle to reduce or eliminate a driving hazard caused by the object. In some embodiments, the V2X message includes a BSM that describes the location of the object, the size of the object, an identity of the object, and a heading of the object. In some embodiments, the image data is generated by one or more cameras that are part of the ego vehicle and the initial image is a raw image. In some embodiments, the computer code, when executed by the processor, further causes the processor to receive range data describing a range between the object and the ego vehicle, wherein the range is measured by a range finding sensor of the ego vehicle. In some embodiments, the object is a remote vehicle and the V2X message is a BSM received from the remote vehicle.

One general aspect includes a computer program product comprising a non-transitory memory storing computer-executable code that, when executed by a processor, causes the processor to: receive a vehicle-to-everything (V2X) message that describes an object that is within proximity of an ego vehicle, generate a set of data-to-camera (D2C) filters that are specific to the object described by the V2X message, apply the set of D2C filters to image data that describes an initial image of the object, and generate a modified image, based on applying the set of D2C filters to the image data, wherein the modified image includes an indication of (1) a location and a size of the object in the initial image and (2) a type of object in the initial image.

Implementations may include one or more of the following features. The computer program product, where the computer-executable code further causes the processor to provide the modified image to an Advanced Driver Assistance System of the ego vehicle to reduce or eliminate a driving hazard caused by the object. In some embodiments, the V2X message includes Basic Safety Messages (BSMs) that describe the location of the object, the size of the object, an identity of the object, and a heading of the object. In some embodiments, the image data is generated by one or more cameras that are part of the ego vehicle and the initial image is a raw image. In some embodiments, the computer-executable code further causes the processor to receive range data describing a range between the object and the ego vehicle, wherein the range is measured by a range finding sensor of the ego vehicle. In some embodiments, the object is a remote vehicle and the V2X message is a Basic Safety Message (BSM) received from the remote vehicle.

At least one improvement of the object detection application described herein over the existing solutions includes that it uses real-time vehicle-to-everything (V2X) data, range data, and or global positioning system (GPS) data to generate a set of data-to-camera (D2C) filters that are specific to an object described by the V2X data. The D2C filters are used to generate a modified image that includes an indication of (1) a location and a size of the object and (2) a type of object. The object may be a moving object, such as a pedestrian with a smartphone, a remote vehicle, etc. or a stationary object, such as a bicycle, a sitting dog, etc. The modified image may be generated using an artificial intelligence process, such as a trained model generated through machine learning, that is both fast enough and accurate enough to be used in a vehicle. For example, the modified image may be used by an Advanced Driver Assistance System (ADAS system) of a connected vehicle to improve object detection in real time. As a result of the objection detect application, driving hazards are reduced or eliminated.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Embodiments of an object detection application installed in connected vehicles are now described. In some embodiments, an ego vehicle includes an object detection application that receives vehicle-to-everything (V2X) data, such as Basic Safety Messages (BSMs), from remote vehicles. The V2X data describes an object that is within proximity of the ego vehicle. The object may be equipped with a V2X radio and transmit V2X messages to the ego vehicle.

The object detection application may extract the V2X data and GPS data from the V2X message and also receive range data from a vehicle sensor set of the ego vehicle, such as radar or LIDAR. The object detection application may generate a set of data-to-camera (D2C) filters that are specific to the object described by the V2X data and the range data. The object detection application may use artificial intelligence (AI) to generate the set of D2C filters in real time.

The ego vehicle may receive an initial image of the object from cameras that are part of the ego vehicle, such as external cameras that provide a raw image or a compressed image. In some embodiments, the object detection application may perform object detection on the initial image to identify a location and a type of object in the initial image. The object detection application applies the set of D2C filters to image data that describes the initial image. The object detection application may generate a modified image based on applying the set of D2C filters to the image data. The modified image may include an indication of (1) a location and a size of the object in the initial image and (2) a type of object in the initial image. The object detection application may provide the modified image to an ADAS system of the ego vehicle for use in reducing or eliminating hazards.

As described herein, examples of V2X communications include, but are not limited to, one or more of the following: Dedicated Short Range Communication (DSRC) (including BSMs and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a V2X message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

In some embodiments, a connected vehicle that includes the object detection application is a DSRC-equipped vehicle. A DSRC-equipped vehicle is a vehicle which: (1) includes a DSRC radio; (2) includes a DSRC-compliant GPS unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. DSRC has a range of substantially 500 meters and is designed to be compatible for wirelessly sending and receiving messages among mobile nodes such as vehicles and RSUs. A DSRC-compliant GPS unit is operable to provide positional information for a vehicle (or some other DSRC-equipped device that includes the DSRC-compliant GPS unit) that has lane-level accuracy.

As used herein, the words "geographic location," "location," "geographic position" and "position" refer to a latitude and longitude of an object (or, a latitude, longitude, and elevation of an object) such as the remote vehicle. The example embodiments described herein provide positioning information that describes a geographic position of the object with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the object with lane-level accuracy or better.

Example Overview

Figure 1:
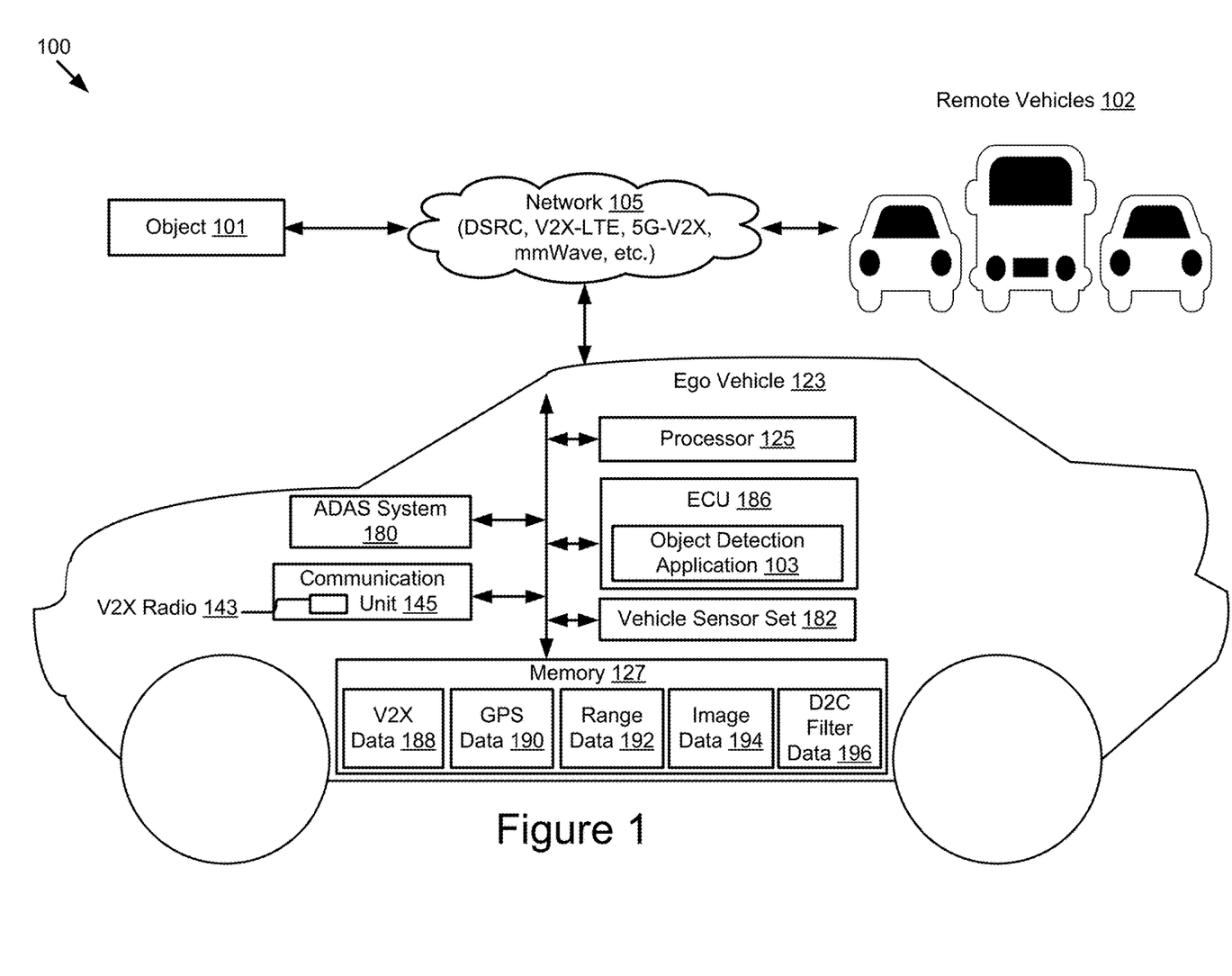
FIG. 1 is a block diagram illustrating an example operating environment for an object detection application according to some embodiments.

Referring to FIG. 1, depicted is an operating environment 100 for an object detection application 103. The operating environment 100 may include one or more of the following elements: an object 101, remote vehicles 102, and an ego vehicle 123. These elements of the operating environment 100 may be communicatively coupled to a network 105. The remote vehicles 102 may transmit V2X messages to the ego vehicle 123 via the network 105. In some embodiments, the operating environment 100 may include roadside units (RSUs) (not illustrated) to aid in transmitting communications between the ego vehicle 123 and the remote vehicles 102.

Although one object 101, one ego vehicle 123, and one network 105 are depicted in FIG. 1, in practice the operating environment 100 may include one or more objects 101, one or more ego vehicles 123, and one or more networks 105.

Conversely, although multiple remote vehicles 102 are depicted in FIG. 1, in practice the operating environment 100 may include one remote vehicle 102.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network, which is a wireless network for sending and receiving V2X messages to other endpoints. The other endpoints include, for example, remote vehicles 102, an object 101, roadside equipment, etc. that include a V2X radio or a communication unit. The V2X radio and the communication unit are wireless communication devices that are operable to send and receive wireless messages via the V2X network.

In some embodiments, one or more of the ego vehicle 123 is a DSRC-equipped device. The network 105 may include one or more communication channels shared among the ego vehicle 123 and the remote vehicles 102. The communication channel may include DSRC, LTE-V2X, full-duplex wireless communication, or any other wireless communication protocol. For example, the network 105 may be used to transmit a DSRC message, a DSRC probe, or a basic safety message (BSM) including any of the data described herein.

The object 101 may be a physical object that is within proximity of the ego vehicle 123. In some embodiments, the object 101 is equipped with a V2X radio and transmits V2X messages to the ego vehicle 123. For example, the object 101 may be a roadside unit, a pedestrian's smartphone or a remote vehicle 102. In some embodiments, the object 101 is any object, such as a dog or a bicycle.

The ego vehicle 123 may be any type of vehicle. For example, the ego vehicle 123 may include one of the following types of vehicles: a car; a truck; a sports utility vehicle; a bus; a semi-truck; a drone; or any other roadway-based conveyance.

The ego vehicle 123 is operated by a driver. The ego vehicle 123 may include one or more of the following elements: a processor 125; a memory 127; a communication unit 145; an ADAS system 180; a vehicle sensor set 182; and an electronic control unit (ECU) 186, which includes the object detection application 103. These elements of the ego vehicle 123 may be communicatively coupled to one another via a bus.

In some embodiments, the processor 125 and the memory 127 may be elements of an onboard vehicle computer system. The onboard vehicle computer system may be operable to cause or control the operation of the object detection application 103. The onboard vehicle computer system may be operable to access and execute the data stored on the memory 127 to provide the functionality described herein for the object detection application 103.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 may include one or more memories 127.

The memory 127 of the ego vehicle 123 may store V2X data 188, GPS data 190, range data 192, image data 194, and D2C filter data 196.

The V2X data 188 is digital data that describes the content of V2X messages received from the remote vehicles 102 and/or the object 101. The one or more V2X messages include one or more of digital data describing V2X broadcast messages, V2X unicast messages, or a combination thereof. The V2X data may include geographic location information, such as location information or GPS data 190 for an endpoint, object 101, or remote vehicle 102 that transmits the V2X message. In some embodiments, the V2X data 188 is BSM data as described in greater detail below.

The GPS data 190 is digital data that may be part of the V2X data 188 or may be received from a satellite, a roadside unit, etc. The GPS data 190 may describe a geographic location of the ego vehicle 123, such as a longitude and latitude of the ego vehicle 123. In some embodiments, the GPS data 190 may be retrieved by a DSRC-compliant GPS unit (not shown) of the ego vehicle 123 that is operable to provide GPS data 190 describing the geographic location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data 190 for this ego vehicle 123 as provided by the DSRC-compliant GPS unit. The GPS data 190 stored in the memory 127 may be aggregated location information from V2X data describing the location of the object 101 or the remote vehicles 102 and the GPS data 190 describing the location of the ego vehicle 123.

The range data 192 is digital data that describes a distance separating the ego vehicle 123 from objects 101 in the environment of the ego vehicle 123. This includes, for example, a distance separating the ego vehicle 123 from remote vehicles 102 that are within proximity of the ego vehicle 123. The range data 192 is generated by the vehicle sensor set 182. For example, the vehicle sensor set 182 includes onboard range finding sensors, such as radar and LIDAR that generate the range data 192.

Image data 194 includes digital data that describe images. The image data 194 includes both initial images that are captured by the vehicle sensor set 182 and modified images that are initial images that were modified by the object detection application 103 based on D2C filter data 196. The initial image may include raw images or compressed images. A modified image may include an indication of (1) the location and/or size of an object 101 in an initial image; and (2) a type of object 101 in the initial image.

D2C filter data 196 is digital data that describes filters that are specific to an object 101 described by the V2X data 188. The D2C filter data 196 is operable to modify the initial image when applied to the image data 194. The D2C filter data 196 identifies information about an object location within an initial image and a type of object 101 within the initial image and maps it to an image-like filter. The object detection application 103 applies the D2C filter data 196 to image data 194 that describes an initial image to generate a modified image that describes the location and/or size of the object 101 and the type of object 101.

The communication unit 145 transmits and receives data to and from the network 105 or to another communication channel. The communication unit 145 includes a V2X radio 143 that supports one or more of the following V2X communication protocols: DSRC; mmWave; LTE-V2X; LTE-D2D; 5G-V2X; ITS-G5; ITS-Connect; LPWAN; visible light communication; television white space; Bluetooth; Wi-Fi, etc. In some embodiments, the object detection application 103 includes code and routines that are operable to control the operation of the V2X radio 143 and cause the V2X radio 143 to receive a V2X message from the object 101 and/or from the remote vehicles 185. For example, the communication unit 145 may listen to channels of the V2X radio 143 for V2X messages from the object 101 and/or remote vehicles 102.

The V2X radio 143 is an electronic device that includes a V2X transmitter and a V2X receiver and is operable to send and receive wireless messages via any V2X protocol, including BSMs. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio 143 includes multiple channels with at least one of these channels designated for sending and receiving BSMs and at least one of these channels designated for sending and receiving PSMs. The communication unit 145 listens to channels of the V2X radio for a V2X message, such as a BSM.

In some embodiments, the communication unit 145 may include a DSRC transceiver, a DSRC receiver and other hardware or software necessary to make the ego vehicle 123 a DSRC-enabled device. For example, the communication unit 145 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or median objects using standard network protocols including TCP/IP, HTTP, HTTPS, and SMTP, millimeter wave, DSRC, etc.

The ADAS system 180 may include one or more advanced driver assistance systems. Examples of the ADAS system 180 may include one or more of the following elements of the ego vehicle 123: an automatic parking system; an adaptive cruise control (ACC) system; an adaptive high beam system; an adaptive light control system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system 180 may receive image data 194 from the object detection application 103 that includes digital data describing a modified image. The ADAS system 180 may use the image data 194 to aid with object detect to avoid an object 101 in a roadway that could cause an accident. For example, the modified image may be used as an input to a vehicle component controlled by the ADAS system 180.

The vehicle sensor set 182 includes one or more sensors that are operable to record various measurements. The vehicle sensor set 182 may include one or more sensors that record one or more physical characteristics of the road environment that is proximate to the ego vehicle 123. For example, the vehicle sensor set 182 may include radar and/or LIDAR that generate range data 192 that describes a range between an object 101 and the ego vehicle 123. The vehicle sensor set 182 may also include cameras, such as external cameras, that capture initial images of an object 101. The memory 127 may store sensor data that describes the one or more physical characteristics recorded by the vehicle sensor set 182.

In some embodiments, the vehicle sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 is an embedded system in automotive electronics that controls one or more of electrical systems or subsystems in the ego vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ego vehicle 123 may include multiple ECUs 186. In some embodiments, the object detection application 103 may be an element of the ECU 186 and the ECU executes the method 800 described in FIG. 8 as determined by the object detection application 103.

In some embodiments, the object detection application 103 includes software that is operable, when executed by the processor 125, to cause the processor 125 to execute method 800 in FIG. 8 as described in greater detail below. For example, the object detection application 103 receives a V2X message that describes an object 101 that is within proximity of the ego vehicle 123. The object detection application 103 generates a set of D2C filters that are specific to the object described by the V2X data 188. The object detection application 103 applies the set of D2C filters to image data 194 that describes an initial image of the object 101. The object detection application 103 generates a modified image, based on applying the set of D2C filters to the image data. The modified image may include an indication of a location and a size of the object 101 in the initial image and a type of object 101 in the initial image.

In some embodiments, the object detection application 103 may be implemented using hardware including a field-programmable gate array ("FPGA") or an application-specific integrated circuit ("ASIC"). In some other embodiments, the object detection application 103 may be implemented using a combination of hardware and software.

The object detection application 103 may be stored in a combination of the devices (e.g., servers or other devices), or in one of the devices.

The remote vehicles 102 may be any type of vehicle. For example, the remote vehicles 102 may include one of the following types of vehicles: a car; a truck; a sports utility vehicle; a bus; a semi-truck; a drone; or any other roadway-based conveyance. The remote vehicles 102 may be a connected vehicle capable of sending a V2X message (including BSMs) like the ego vehicle 123. In some embodiments, at least one of the remote vehicles 102 is an unconnected vehicle.

Example Computer System

Figure 2:
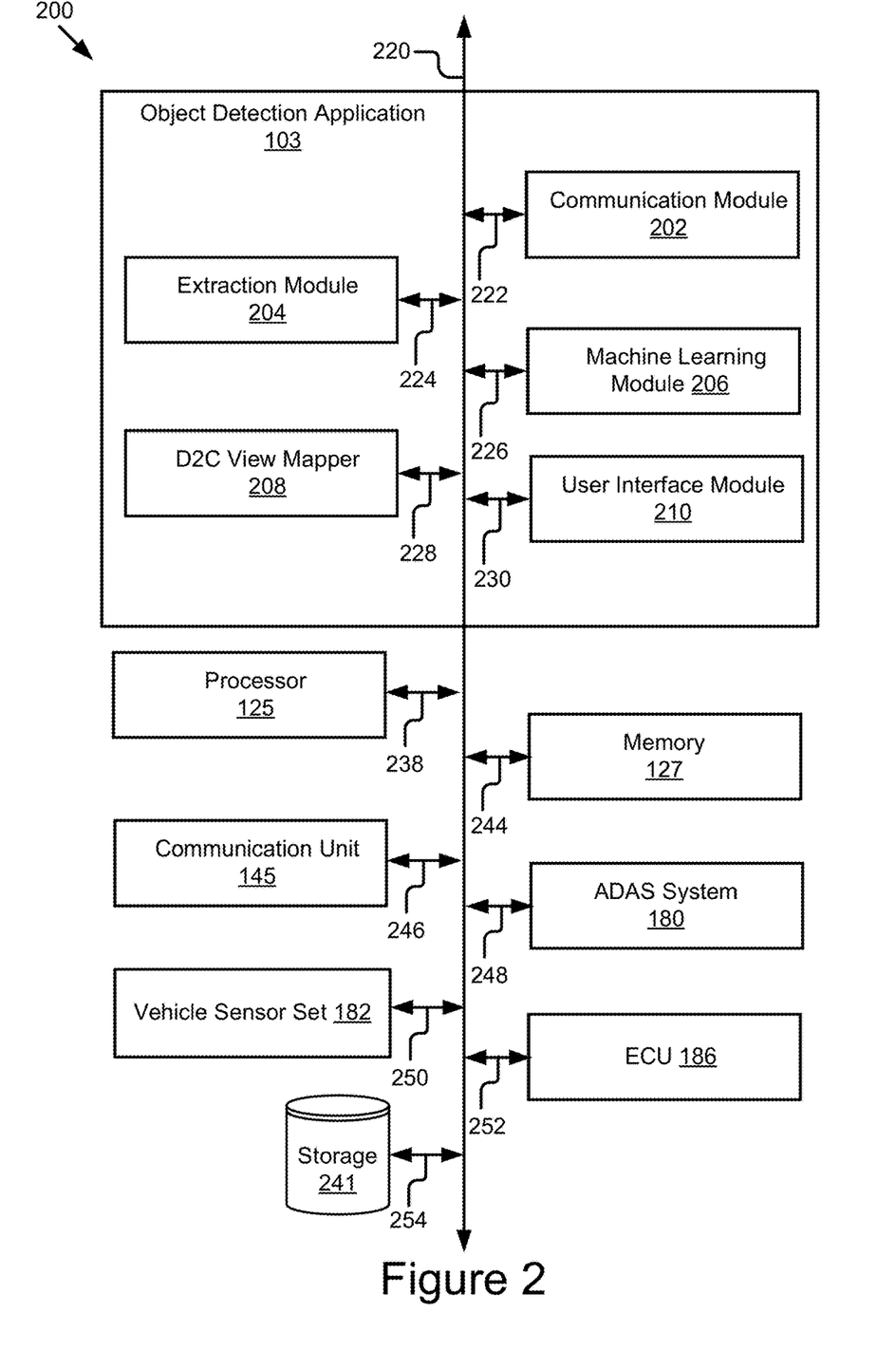
FIG. 2 is a block diagram illustrating an example computer system for an object detection application according to some embodiments.

Referring now to FIG. 2, depicted is a block diagram illustrating an example computer system 200 including the object detection application 103 according to some embodiments. In some embodiments, the computer system 200 may include a special-purpose computer system that is programmed to perform one or more steps of method 800 described below with reference to FIG. 8. In some embodiments, the computer system 200 may be an element of a connected device. For example, the connected device can be the ego vehicle 123.

The computer system 200 may include one or more of the following elements according to some examples: the object detection application 103; the processor 125; the memory 127; the communication unit 145; the ADAS system 180; the vehicle sensor set 182; the ECU 186; and a storage 241. The components of the computer system 200 are communicatively coupled by a bus 220.

In the illustrated embodiment, the processor 125 is communicatively coupled to the bus 220 via a signal line 238. The memory 127 is communicatively coupled to the bus 220 via a signal line 244. The communication unit 145 is communicatively coupled to the bus 220 via a signal line 246. The ADAS system 180 is communicatively coupled to the bus 220 via a signal line 248. The vehicle sensor set 182 is communicatively coupled to the bus 220 via a signal line 250. The ECU is communicatively coupled to the bus 220 via a signal line 252. The storage 241 is communicatively coupled to the bus 220 via a signal line 254.

The following elements of the computer system 200 are described above with reference to FIG. 1, and so, those descriptions will not be repeated here: the processor 125; the memory 127; the communication unit 145; the ADAS system 180; the vehicle sensor set 182; and the ECU 186.

The memory 127 may store any of the data described above with reference to FIG. 1. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the object detection application 103 includes: a communication module 202; an extraction module 204; a machine learning module 206; a D2C view mapper; and a user interface module 210. These components of the object detection application 103 are communicatively coupled to each other via the bus 220. In some embodiments, components of the object detection application 103 can be stored in a single server or device. In some other embodiments, components of the object detection application 103 can be distributed and stored across multiple servers or devices. For example, some of the components of the object detection application 103 may be distributed across the server 110 and the ego vehicle. Although the object detection application 103 is illustrates as being a standalone application connected to the bus, in some embodiments, the object detection application 103 is a component of the ECU 186 as illustrated in FIG. 1.

The communication module 202 can be software including routines for handling communications between the object detection application 103 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more V2X messages including BSMs from the object 101 and/or the remote vehicles 102. The communication module 202 may send or receive any of the data or messages described above with reference to FIG. 1 via the communication unit 145.

In some embodiments, the communication module 202 receives data from components of the object detection application 103 and stores the data in one or more of the storage 241 and the memory 127. For example, the communication module 202 receives any of the data described above with reference to the memory 127 from the communication unit 145 (via the network 105, a V2X message, such as a BSM) or from the vehicle sensor set 182 and stores this data in the memory 127 (or temporarily in the storage 241 which may act as a buffer for the computer system 200). In some embodiments, in response to receiving a V2X message, the communication module 202 instructs a range-finding sensor that is part of the vehicle sensor set 182 (such as radar or LIDAR) to record range rata 192 describing a range separating the ego vehicle 123 from the object 101 that broadcasted the V2X. In some embodiments, in response to receiving a V2X message, the communication module 202 may instruct a camera of the vehicle sensor set 182 (such as an external camera) to record image data 194 describing one or more initial images of the environment of the ego vehicle 123 where at least one of the images includes the object 101. In another example, the communication module 202 transmits a modified image to the ADAS system 180 for aiding the ADAS system 180 in performing object recognition.

In some embodiments, the communication module 202 may handle communications between components of the object detection application 103. For example, the communication module 202 may handle communications among the machine learning module 206 and the D2C view mapper 208 to provide the D2C view mapper 208 with a trained model for use in generating a set of D2C filters. Any of these modules may cause the communication module 202 to communicate with the other elements of the computer system 200 or the operating environment 100 (via the communication unit 145).

The extraction module 204 can be software including routines for extracting non-camera data. In some embodiments, the extraction module 204 can be stored in the memory 127 of the computer system 200 and can be accessible and executable by the processor 125. The extraction module 204 may be adapted for cooperation and communication with the processor 125 and other components of the computer system 200 via a signal line 224.

The extraction module 204 may receive three kinds of non-camera data: V2X data 188, GPS data 190, and range data 192. The extraction module 204 receives a V2X message that describes an object 101 that is within proximity of the ego vehicle 123. The V2X message is received from the object 101 and/or remote vehicles 102 via the communication unit 145. The extraction module 204 extracts V2X data 188 from the V2X message. The extraction module 204 may also extract GPS data 190 from the V2X message that describes a location of the object 101 and/or the remote vehicles 102 depending on the source of the V2X message. Alternatively, or additionally, the extraction module 204 may receive GPS data 190 that describes a location of the ego vehicle 123 from the vehicle sensor set 182.

In some embodiments, the V2X message is a BSM transmitted by the object 101 (where the object 101 is a remote vehicle 102) or from the remote vehicles 102. The BSM data is illustrated as a block diagram 300 in FIG. 3 and includes BSM data that is broadcast over the 5.9 GHz DSRC band. The transmission range is on the order of 1,000 meters (or may be as large as 1,000 meters).

Figure 3:
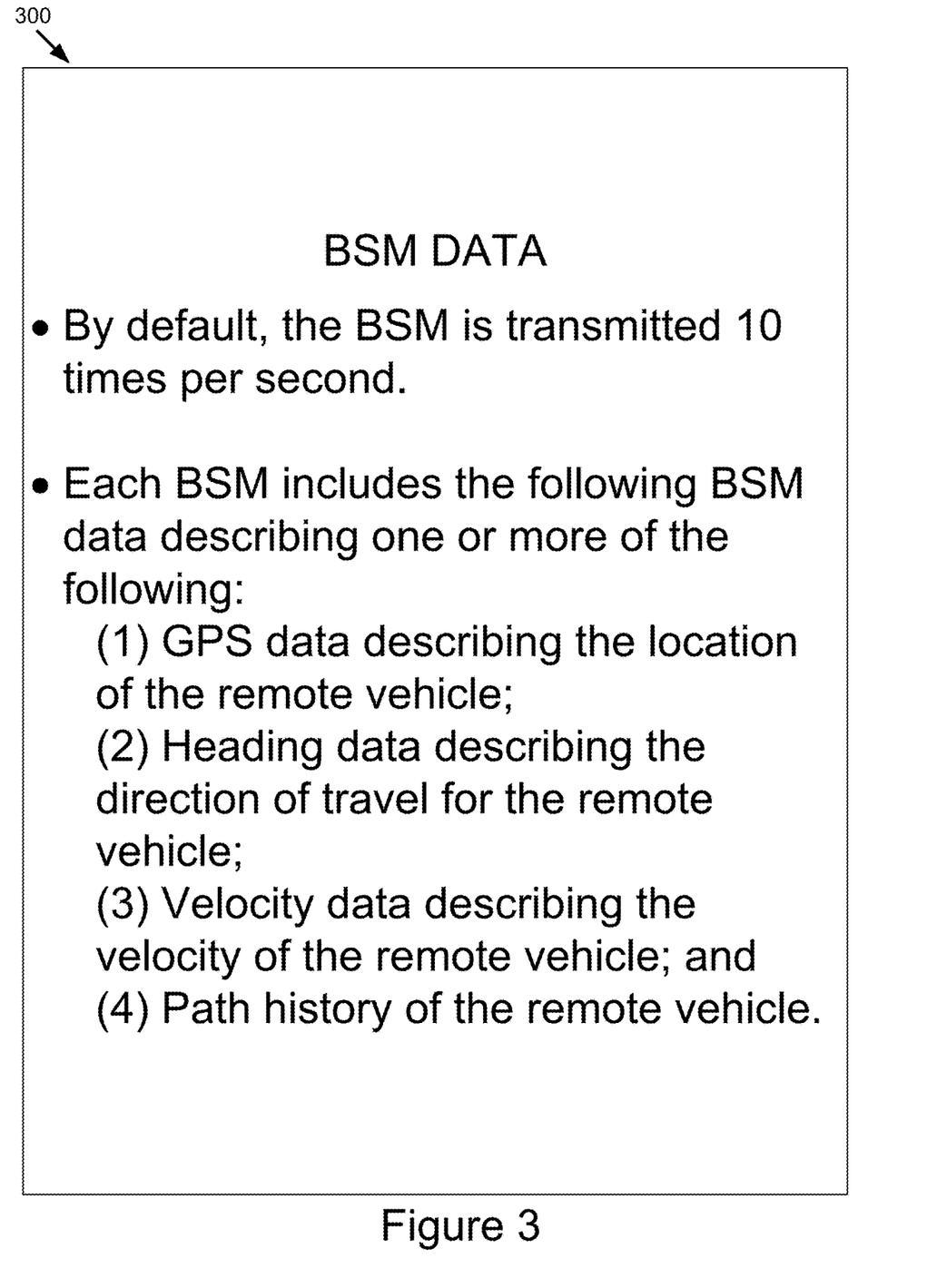
FIG. 3 is an example block diagram of BSM data according to some embodiments.

A BSM includes BSM data. The BSM data describes attributes of the remote vehicle 102 that originally transmitted the BSM message. In some embodiments, the BSM is received from an object 101 that is a remote vehicle 102. Vehicles equipped with DSRC may broadcast BSMs at an adjustable rate. In some implementations, the rate may be once every 0.10 seconds. The BSM includes BSM data that describes, among other things, one or more of the following: (1) GPS data describing the location of the remote vehicle 102; (2) heading data describing the direction of travel for the remote vehicle 102; velocity data describing the velocity of the remote vehicle 102; and path history of the remote vehicle 102.

Figure 4:
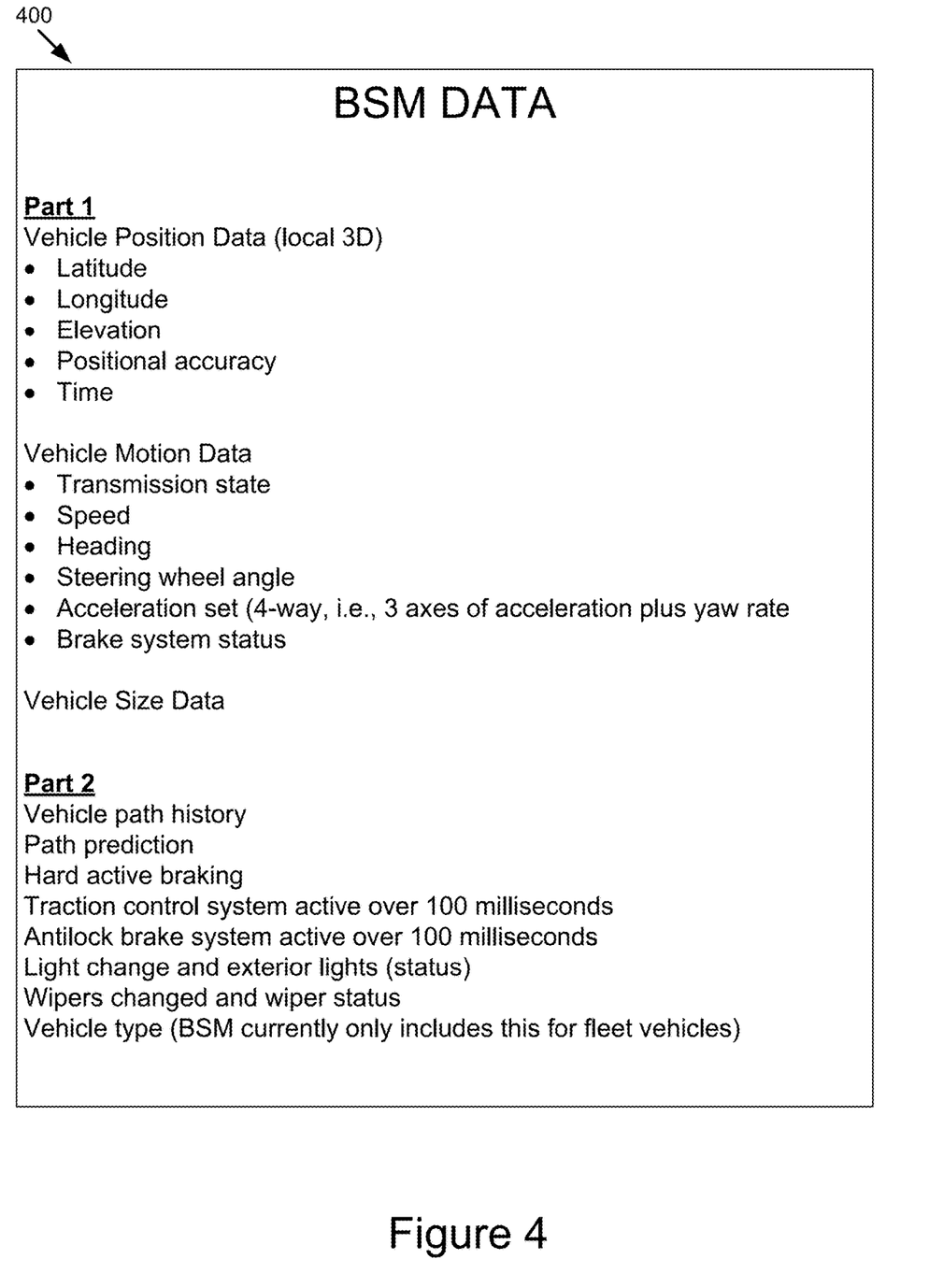
FIG. 4 is an example block diagram of the two parts of BSM data according to some embodiments.

FIG. 4 is an example block diagram 400 of the two parts of BSM data. A BSM may include two parts. The two parts may include different BSM data. Part 1 of the BSM data may describe one or more of the following: vehicle position data (for example, latitude, longitude, elevation, and positional accuracy all as a function of time); vehicle motion data (for example, transmission state, speed, heading, steering wheel angle, acceleration set (4-way), which includes three exes of acceleration plus yaw rate, and brake system status); and vehicle size.

Part 2 of the BSM data may include a variable set of data elements drawn from a list of optional elements. For example, part 2 may include vehicle path history, path prediction, hard active braking, a traction control system active over 100 milliseconds (or 100 microseconds), an antilock brake system active over 100 milliseconds (or 100 microseconds), a status of lights changed and exterior lights, wipers changed and wiper status, and vehicle type (for fleet vehicles).

In some embodiments, part 1 of the BSM is transmitted at an adjustable rate of about 10 times per second. Part 2 of the BSM contains a variable set of data elements drawn from an extensive list of optional elements. Some of the data elements are selected based on event triggers. For example, anti-locking brake system (ABS) being activated may trigger BSM data relevant to the ABS system of the ego vehicle 123 or the remote vehicles 102. In some embodiments, some of the elements of Part 2 are added to part 1 and sent as part of the BSM message or some of the elements are transmitted less frequently in order to conserve bandwidth. In some implementations, the BSM data included in a BSM includes current snapshots of a vehicle traveling along a roadway system (with the exception of path data, which is itself limited to a few seconds of past history data).

The extraction module 204 may extract from the V2X data 188 information about a location and a size of the object 101 and a type of object 101. For example, where the V2X message is a BSM, the extraction module 204 may extract (1) the location of the object 101; (2) a type of object 101 that transmitted the BSM; (3) a heading of the object 101 that transmitted the BSM; and (4) a size of the object 101 that transmitted the BSM.

In some embodiments, the extraction module 204 may determine information about the location and the size of the object 101 and the type of object 101 from V2X data 188 received by remote vehicles 102 that are not the object 101. For example, the V2X data 188 received by the remote vehicles 102 that are not the object 101 may provide information about the object, such as its location and size, and a proximity of the remote vehicle 102 to the object 101.

In some embodiments, the extraction module 204 may determine information about the location and the size of the object 101 and the type of object 101 from the initial image. For example, the extraction module 204 may perform object recognition of the initial image to identify the location and size of the object and the type of object.

The machine learning module 206 can be software including routines for using artificial intelligence to generate a trained model for generating D2C filters. In some embodiments, the machine learning module 206 can be stored in the memory 127 of the computer system 200 and can be accessible and executable by the processor 125. The machine learning module 206 may be adapted for cooperation and communication with the processor 125 and other components of the computer system 200 via a signal line 226.

The machine learning module 206 generates a trained model that is used by the D2C view mapper 208 to generate a set of D2C filters that are specific to an object 101 described by the V2X data extracted by the extraction module 204.

In some embodiments, the machine learning module 206 uses training data to create a trained model that generates D2C filters. For example, the machine learning module 206 may receive training data that includes non-camera data that describes an object, such as V2X data 188, GPS data 190, and range data 192. The machine learning module 206 uses the non-camera data to generate a set of D2C filters and applies the set of D2C filters to an initial image to generate a modified image. The modified image includes (1) a location and a size of the object in the initial image and (2) a type of object in the initial image. In some embodiments, the machine learning module 206 may generate a bounding box around the object. The machine learning module 206 may compare the modified image with a control image that has an accurate description of the location and the size of the object and the type of object. The machine learning module 206 may revise the training model based on the comparison. In some embodiments, the generation of the trained model may be an iterative process where the trained model is increasingly refined by providing additional training data.

In some embodiments, the machine learning module 206 may generate a trained model based on supervised learning, for example, based on a user or an algorithm identifying the location and the size of the object and the type of object. The trained model may include a variety of model forms or structures, such as a neural-network (e.g., a linear network), a deep neural network that implements a plurality of layers (e.g., hidden layers between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data such as a series of locations of a vehicle, images of a parking lot, etc. and produces as output a result sequence), etc.

The model form or structure may specify connectivity between various nodes and an organization of nodes into layers. For example, nodes of a first layer (e.g., an input layer) may receive V2X data 188, GPS data 190, and range data 192 that describe the object. Subsequent intermediate layers may receive as input output of nodes of a previous layer per the connectivity specified in the model form or structure. These layers may also be referred to as hidden layers. A final layer (e.g., an output layer) produces an output of the trained model. For example, the output may be the trained model for generating a set of D2C filters.

In some embodiments, the trained model may be refined through feedback. For example, the machine learning module 206 may receive an identification of information about an object in an initial image. As a result of the feedback, the machine learning module 206 may generate a revised trained model. As a result, the machine learning module 206 may update the trained model with the feedback about the length of time of availability of the parking spots.

The D2C view mapper 208 can be software including routines for generating a set of D2C filters that are specific to the object 101 described by the V2X data 188 and applying the set of D2C filters to an initial image to generate a modified image. In some embodiments, the D2C view mapper 208 can be stored in the memory 127 of the computer system 200 and can be accessible and executable by the processor 125. The D2C view mapper 208 may be adapted for cooperation and communication with the processor 125 and other components of the computer system 200 via a signal line 228.

In some embodiments, the D2C view mapper 208 receives a trained model from the machine learning module 206 that the D2C view mapper 208 uses to generate the set of D2C filters. In some embodiments, the D2C view mapper 208 uses the V2X data 188, GPS data 190 extracted from the V2X data 188, and range data 192 to generate the set of D2C filters that are particular to an object 101. For example, the D2C view mapper 208 receives from the extraction module 204 the BSM data described by the V2X data 188 that identifies the location, identity, heading, and size of the object 101. The D2C view mapper 208 uses the BSM data to generate the set of D2C filters, which describe digital data that is operable to modify the initial image when applied to image data 194 that describes the initial image. The D2C view mapper 208 may generate the set of D2C filters in real time. The D2C view mapper 208 may save D2C filter data 196 that describes the set of D2C filters.

The D2C view mapper 208 maps the set of D2C filters to a view from the ego vehicle 123 by applying the set of D2C filters to image data 194 that describes an initial image and generates a modified image. In some embodiments, applying the set of D2C filters to the image data 194 includes performing object recognition of the initial image based on the set of D2C filters. The modified image includes an indication of (1) a location and a size of the object 101 in the initial image and (2) a type of object 101 in the initial image. The type of object 101 includes, for example, whether the object 101 is a vehicle, a pedestrian, a roadside unit, etc. In some embodiments, the modified image further includes a bounding box that surrounds the object 101.

Figure 5:
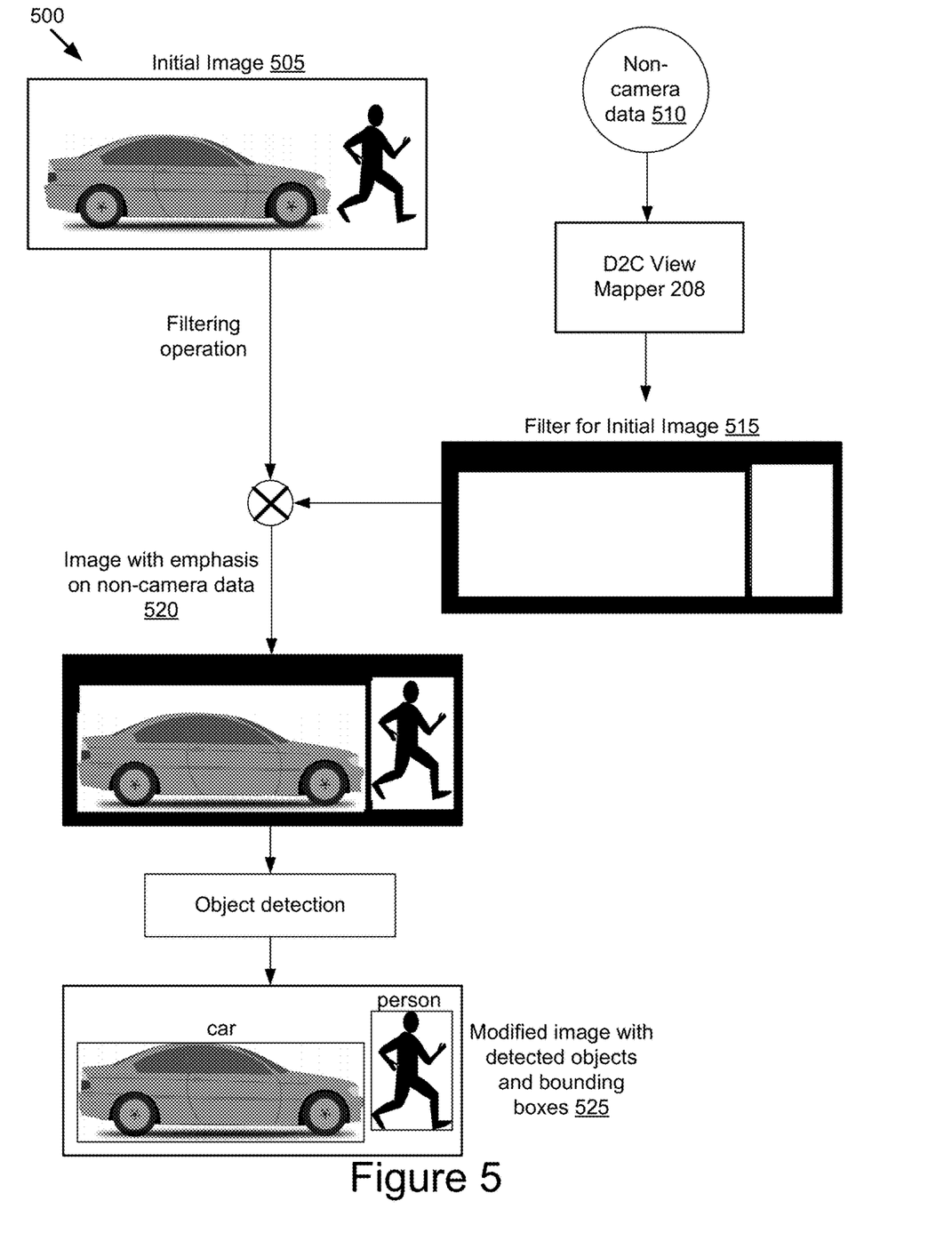
FIG. 5 is an example block diagram illustrating the generation of a modified image according to some embodiments.

Turning to FIG. 5, an example block diagram 500 illustrating the generation of a modified image is illustrated. In this example, the object detection application 103 receives an initial image 505 and non-camera data 510. The non-camera data 510 is processed by the D2C view mapper 208 to generate a filter for the initial image 515. The filter for the initial image 515 is applied to the initial image 505 to generate an image with emphasis on non-camera data 520. The D2C view mapper 208 then performs object detection on the image to detect the location of the objects and generate a modified image with detected objects and bounding boxes 525. The modified image also includes an identification of the types of objects. Specifically, the modified image identifies the car and the person from the initial image.

Figure 6:
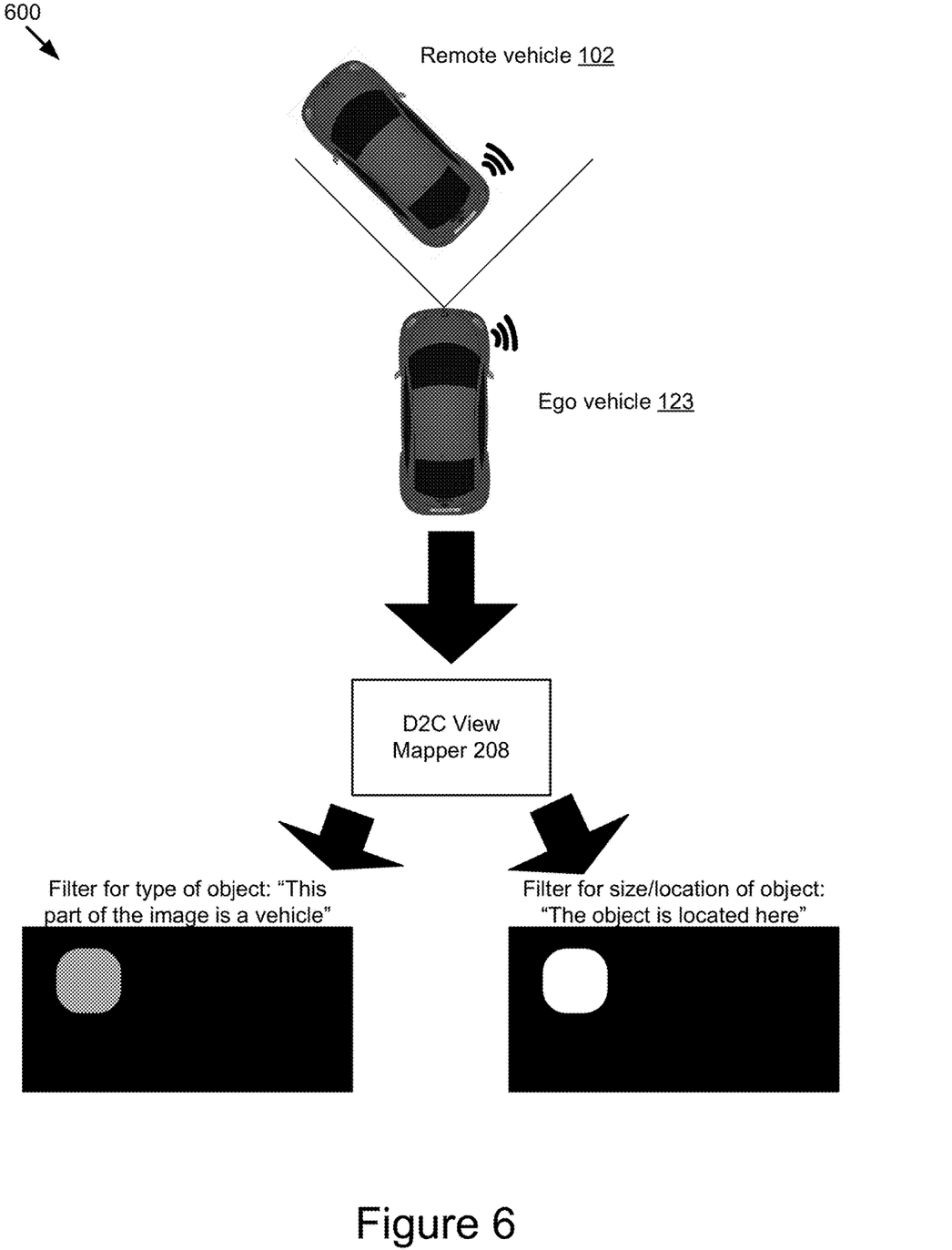
FIG. 6 depicts a flowchart of an example process diagram for generating a modified image according to some embodiments.

FIG. 6 depicts a flowchart of an example process diagram 600 for generating a modified image according to some embodiments. In the first step, the ego vehicle 123 receives a V2X message from a remote vehicle 102 that is within line of sight of an external camera of the ego vehicle 123. In the second step, the D2C view mapper 208 determines where the remote vehicle 102 should appear in the initial image captured by the external camera of the ego vehicle 123. In the third step, the D2C view mapper 208 generates two D2C filters: one for object type and one for object location.

Figure 7:
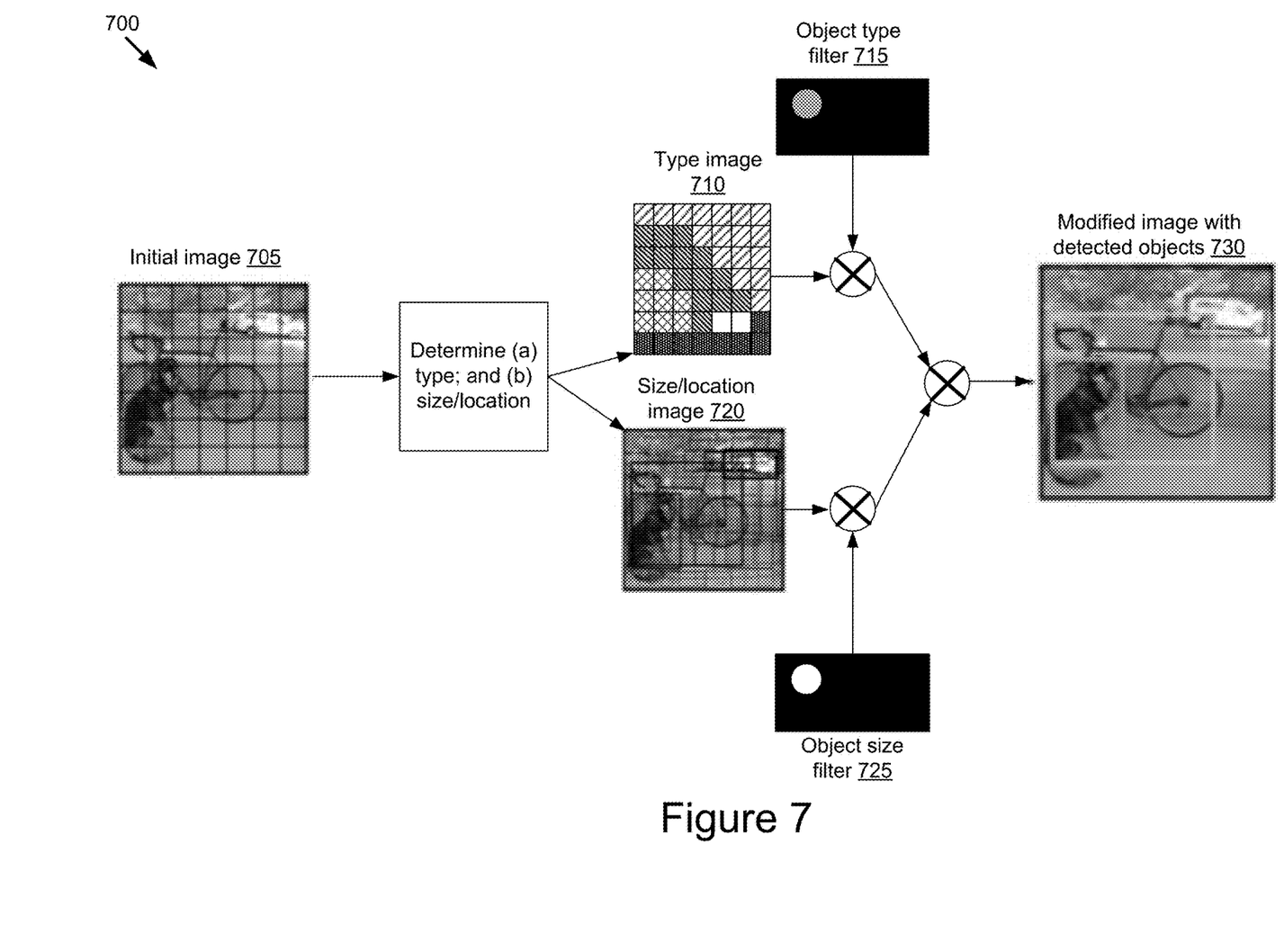
FIG. 7 depicts an example use case according to some embodiments.

FIG. 7 depicts an example use case 700 according to some embodiments. The object detection application 103 receives an initial image 705. In this example, the initial image 705 illustrates a dog standing in front of a bicycle with a vehicle in the upper right-hand corner. The object detection application 103 determines a type and size/location of the objects in the initial image 705. A type image 710 shows how different squares are categorized to identify different types of objects within the initial image 705. A size/location image 720 shows bounding boxes around the different objects within the initial image 705 to identify the size and location of the different objects. An object type filter 715 and an object size filter 725 that were both generated by the D2C view mapper 208 are applied to the type image 710 and size/location image 715. Based on the application of the filters, the object detection application 103 generates a modified image with detected objects 730.

Although the above examples are described with reference to an object 101 that is within proximity to the ego vehicle 123, in some embodiments, the object 101 may not be within the line-of-sight of the ego vehicle 123. For example, the object may be a red car on a perpendicular street at an intersection. In some embodiments, the D2C view mapper 208 extends its functionality for non-line of sight objects that will soon enter the line of sight of the ego vehicle 123. The D2C view mapper 208 may receive the V2X data 188 and the GPS data 190 from the extraction module 204, generate the set of D2C filters, and generate a modified image based on the set of D2C filters. For example, the D2C view mapper 208 may generate a modified image that is a combination of the object type filter 715 and the object size filter 725 illustrated in FIG. 7. The modified image provided to the ADAS system 180 may warn the ADAS system 180 to expect a red car as the ego vehicle 123 approaches the intersection.

In some embodiments, after the D2C view mapper 208 generates the modified image, the D2C view mapper 208 provides the modified image to the ADAS system 180 via the communication module 202. For example, the ADAS system 180 may modify the operation of the ADAS system 180 based on the object detection.

The user interface module 210 can be software including routines for generating a user interface. In some embodiments, the user interface module 210 can be stored in the memory 127 of the computer system 200 and can be accessible and executable by the processor 125. The user interface module 210 may be adapted for cooperation and communication with the processor 125 and other components of the computer system 200 via a signal line 230.

The user interface module 210 may receive the modified image from the D2C view mapper 208 and display the modified image on an in-vehicle display. In some embodiments, the modified image includes the bounding boxes so a driver can identify the location of the object 101. In some embodiments, the user interface module 210 displays a user interface with options for modifying the settings of the object detection application 103. For example, the user interface may include options for configuring types of V2X data 188 received, identify information about the vehicle sensor set 182, etc.

Example Processes

Figure 8:
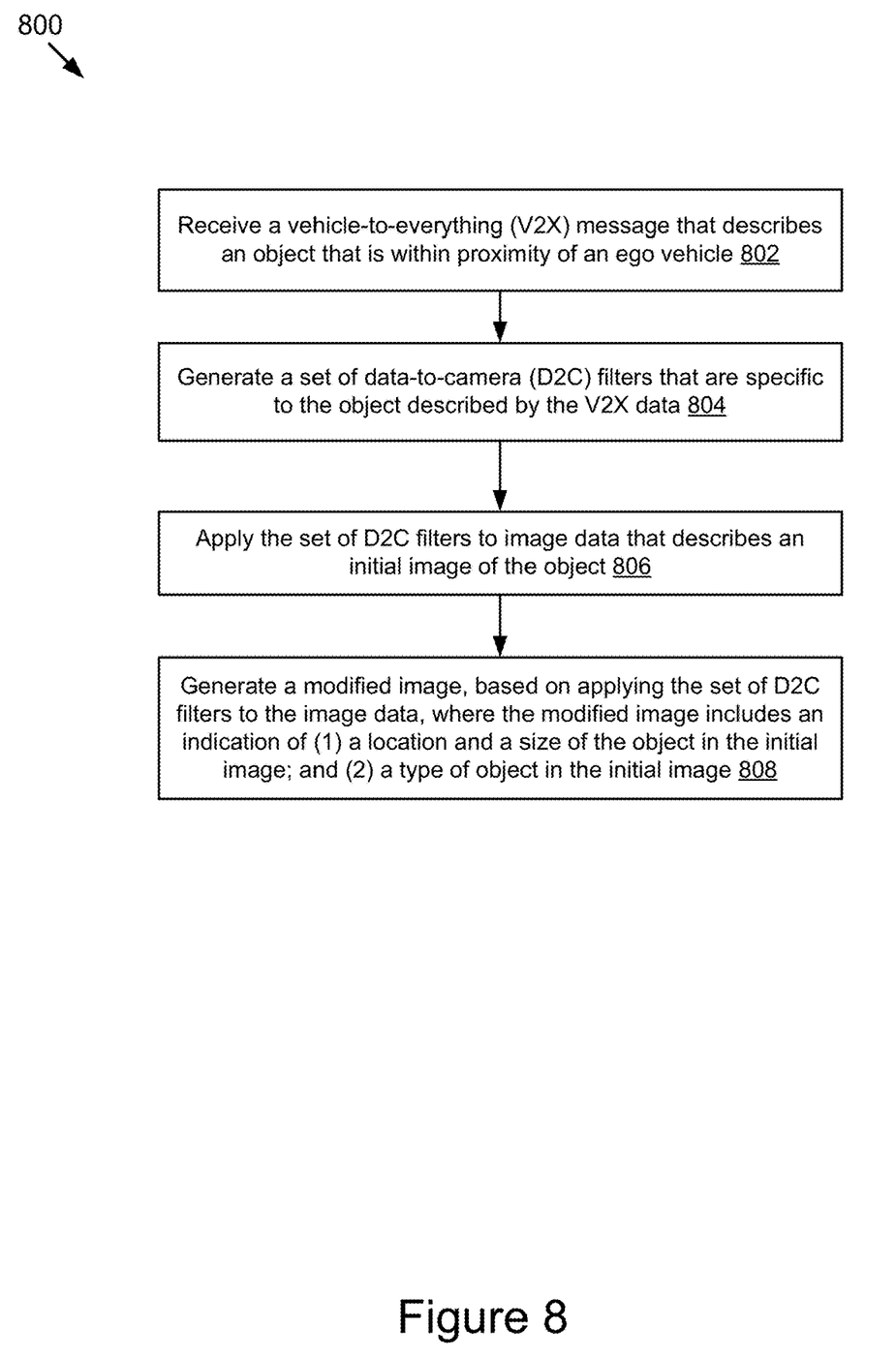
FIG. 8 depicts a flowchart of an example method for generating a modified image according to some embodiments.

Referring now to FIG. 8, depicted is a flowchart of an example method 800 for generating a modified image according to some embodiments. The steps of the method 800 are executable in any order, and not necessarily the order depicted in FIG. 8. The method 800 is performed by the object detection application 103 stored on the ego vehicle 123.

At step 802, a V2X message is received that describes an object 101 that is within proximity of an ego vehicle 123. The object 101 may be a remote vehicle 102, a pedestrian (including a smartphone), a bicycle, etc. The V2X message may be a BSM.

At step 804, a set of D2C filters is generated that are specific to the object described by the V2X data. For example, the object detection application 103 may generate an object type filter and an object size filter.

At step 806, a modified image is generated, based on applying the set of D2C filters to the image data, where the modified image includes an indication of (1) a location and a size of the object in the initial image; and (2) a type of object in the initial image.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving a vehicle-to-everything (V2X) message that describes an object that is within proximity of an ego vehicle;
    generating a set of data-to-camera (D2C) filters that are specific to the object described by the V2X message by:
        determining where the object is expected to appear in an initial image,
        generating a first D2C filter for an object type, and
        generating a second D2C filter for an object location based on where the object is expected to appear in the initial image;
    applying the set of D2C filters to image data that describes the initial image of the object; and
    generating a modified image, based on applying the set of D2C filters to the image data, wherein the modified image includes an indication of (1) a location and a size of the object in the initial image and (2) a type of object in the initial image.

2. The method of claim 1, further comprising:
    providing the modified image to an Advanced Driver Assistance System of the ego vehicle to reduce or eliminate a driving hazard caused by the object.

3. The method of claim 1, wherein the V2X message includes a Basic Safety Message (BSM) that describes the location of the object, the size of the object, an identity of the object, and a heading of the object.

4. The method of claim 1, wherein the D2C filters are generated using a trained machine-learning model.

5. The method of claim 1, further comprising:
    receiving range data describing a range between the object and the ego vehicle, wherein the range is measured by a range finding sensor of the ego vehicle.

6. The method of claim 1, wherein the object is a remote vehicle and the V2X message is a Basic Safety Message (BSM) received from the remote vehicle.

7. The method of claim 1, wherein the set of D2C filters are generated in real time and the set of D2C filters describe digital data that is operable to modify the initial image.

8. The method of claim 1, wherein the modified image further includes a bounding box that surrounds the object.

9. A system for an ego vehicle, comprising:
    a processor; and
    a non-transitory memory storing computer code which, when executed by the processor, causes the processor to:
        receive a vehicle-to-everything (V2X) message that describes an object that is within proximity of an ego vehicle;
        generate a set of data-to-camera (D2C) filters that are specific to the object described by the V2X message by:
            determining where the object is expected to appear in an initial image,
            generating a first D2C filter for an object type, and
            generating a second D2C filter for an object location based on where the object is expected to appear in the initial image;
        apply the set of D2C filters to image data that describes an initial image of the object; and
        generate a modified image, based on applying the set of D2C filters to the image data, wherein the modified image includes an indication of (1) a location and a size of the object in the initial image and (2) a type of object in the initial image.

10. The system of claim 9, wherein the computer code, when executed by the processor, further causes the processor to:
    provide the modified image to an Advanced Driver Assistance System of the ego vehicle to reduce or eliminate a driving hazard caused by the object.

11. The system of claim 9, wherein the V2X message includes a Basic Safety Message (BSM) that describes the location of the object, the size of the object, an identity of the object, and a heading of the object.

12. The system of claim 9, wherein the D2C filters are generated using a trained machine-learning model.

13. The system of claim 9, wherein the computer code, when executed by the processor, further causes the processor to:
    receive range data describing a range between the object and the ego vehicle, wherein the range is measured by a range finding sensor of the ego vehicle.

14. The system of claim 9, wherein the object is a remote vehicle and the V2X message is a Basic Safety Message (BSM) received from the remote vehicle.

15. A computer program product comprising a non-transitory memory storing computer-executable code that, when executed by a processor, causes the processor to:
    receive a vehicle-to-everything (V2X) message that describes an object that is within proximity of an ego vehicle;
    generate a set of data-to-camera (D2C) filters that are specific to the object described by the V2X message by:
        determining where the object is expected to appear in an initial image,
        generating a first D2C filter for an object type, and
        generating a second D2C filter for an object location based on where the object is expected to appear in the initial image;
    apply the set of D2C filters to image data that describes an initial image of the object; and
    generate a modified image, based on applying the set of D2C filters to the image data, wherein the modified image includes an indication of (1) a location and a size of the object in the initial image and (2) a type of object in the initial image.

16. The computer program product of claim 15, wherein the computer-executable code further causes the processor to:
    provide the modified image to an Advanced Driver Assistance System of the ego vehicle to reduce or eliminate a driving hazard caused by the object.

17. The computer program product of claim 15, wherein the V2X message includes a Basic Safety Message (BSM) that describes the location of the object, the size of the object, an identity of the object, and a heading of the object.

18. The computer program product of claim 15, wherein the D2C filters are generated using a trained machine-learning model.

19. The computer program product of claim 15, wherein the computer-executable code further causes the processor to:
    receive range data describing a range between the object and the ego vehicle, wherein the range is measured by a range finding sensor of the ego vehicle.

20. The computer program product of claim 15, wherein the object is a remote vehicle and the V2X message is a Basic Safety Message (BSM) received from the remote vehicle.

* * * * *